(12) United States Patent
Michalewich et al.

(10) Patent No.: US 12,515,106 B2
(45) Date of Patent: Jan. 6, 2026

(54) MULTI-LAYER GOLF BALLS WITH INCREASED INTERLAYER ADHESION

(71) Applicant: Acushnet Company, Fairhaven, MA (US)

(72) Inventors: Michael Michalewich, Norton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/108,271

(22) Filed: Feb. 10, 2023

(65) Prior Publication Data

US 2024/0278076 A1    Aug. 22, 2024

(51) Int. Cl.
| | | |
|---|---|---|
| *A63B 37/06* | (2006.01) | |
| *A63B 37/00* | (2006.01) | |
| *C08J 3/24* | (2006.01) | |
| *C08J 7/04* | (2020.01) | |
| *C08J 7/043* | (2020.01) | |

(52) U.S. Cl.
CPC ...... *A63B 37/0024* (2013.01); *A63B 37/0039* (2013.01); *A63B 37/0075* (2013.01); *A63B 37/0076* (2013.01); *C08J 3/245* (2013.01); *C08J 7/042* (2013.01); *C08J 7/043* (2020.01); *C08J 2309/00* (2013.01); *C08J 2323/22* (2013.01); *C08J 2475/02* (2013.01); *C08J 2475/04* (2013.01)

(58) Field of Classification Search
CPC .................................................. A63B 37/0023
See application file for complete search history.

(56) References Cited

U.S. PATENT DOCUMENTS

| | | | |
|---|---|---|---|
| 4,968,752 | A | 11/1990 | Kawamoto et al. |
| 5,091,478 | A | 2/1992 | Saltman |
| 5,155,157 | A | 10/1992 | Statz et al. |
| 5,932,661 | A | 8/1999 | Simonutti |
| 6,677,401 | B2 | 1/2004 | Boehm et al. |
| 6,756,436 | B2 | 6/2004 | Rajagopalan et al. |
| 6,992,135 | B2 | 1/2006 | Boehm et al. |
| 2004/0072629 | A1* | 4/2004 | Keller ................ A63B 37/0003 473/374 |
| 2015/0119167 | A1* | 4/2015 | Inoue ...................... C08L 77/02 525/183 |

\* cited by examiner

*Primary Examiner* — Raeann Gorden
(74) *Attorney, Agent, or Firm* — Bradley Arant Boult Cummings LLP

(57) ABSTRACT

Casing compositions including carboxylic acid groups, cover compositions including an adhesion promoter with functional groups that crosslink with carboxylic acid groups, and golf balls made from such compositions that have crosslinks between functional groups of the cover compositions and the carboxylic acid groups. The type and concentration of the components in the casing and cover compositions, including the adhesion promoter, affect the adhesion between golf balls having components made from such compositions and, thus, can be used to produce a golf ball having increased durability. Additionally, methods of crosslinking casing and cover layers made from such casing and cover compositions to increase interlayer adhesion are disclosed.

19 Claims, 3 Drawing Sheets

MULTI-LAYER GOLF BALLS WITH INCREASED INTERLAYER ADHESION

FIELD OF THE INVENTION

The present disclosure relates generally to compositions for use in golf ball components that facilitate crosslinks between the components and methods of forming golf balls made from such components. The compositions and methods of the present disclosure result in golf ball components with improved adhesion strength therebetween. In addition, the compositions and methods of the present disclosure result in golf balls with better shear durability (as compared to conventional golf balls). More particularly, the present disclosure provides compositions and golf ball components made from such compositions that provide increased shear durability and increased adhesion strength between two or more layers golf ball when such components are used in a golf ball. In addition, the present disclosure provides methods of making golf balls using such compositions and components made from such compositions to produce golf balls having increased shear durability and increased adhesion strength between layers.

BACKGROUND OF THE INVENTION

The performance and/or durability of a golf ball is affected by a variety of factors including the materials, weight, size, dimple pattern, and external shape of the golf ball. As a result, golf ball manufacturers are constantly improving or tweaking the materials and construction of a ball in an effort to make incremental gains in performance without sacrificing durability.

In this aspect, one issue with the multi-piece golf balls commonly used in modern play is the lack of adhesion between layers of the golf ball. Adhesion strength is a direct measure of the adhesion between two or more layers of a golf ball. The adhesion strength between two layers can be measured as the force required to separate the two layers. Low adhesion strength between layers of a golf ball may result in the golf ball having low shear durability. Golf balls having a low shear durability may delaminate more frequently when exposed to a shear force. Delamination is decoupling of an outer layer of the golf ball, such as the cover of the golf ball, from an adjacent inner layer, such as a casing layer. Delamination commonly occurs when a golf ball is struck with a high-angle club, such as a wedge, that imposes a strong shear force on the golf ball. As a result of the shear force, the outer and inner layers may move in different directions or at different speeds and decouple from each other. Delamination may be visibly apparent as "bubbling" or air pockets between layers or as cutting in the cover of the golf ball. Delamination detrimentally affects not only the appearance of the golf ball but the performance as well.

Modern multi-piece, solid golf balls often include a core, a casing layer disposed around the core, and a cover layer disposed around the casing layer. Casing layers and cover layers may be made of a variety of materials including ethylene acid copolymer ionomers, polyamides, polyesters, polyurethanes, and polyureas. In particular, cover layers are commonly cast from polyurethane. For example, popular three-piece golf balls may include a rubber core surrounded by an ionomer-based casing layer and a urethane-based cover layer.

Currently, several different types of adhesion promoting pre-treatment processes exist for addressing cut and shear issues caused by lack of adhesion between casing and cover layers. Examples of pretreatments include surface roughening; surface energy modifications such as corona, plasma, and flame treatments; adhesives; adhesion promoters and combinations thereof. Adhesives are typically applied via spray or dip and usually require a drying and post cure step. Adhesion promoters are likewise usually applied by dip or spray, followed by rinsing and drying steps. For golf balls having a cast urethane cover disposed on a casing layer, the casing layer must be treated with primer to increase adhesion between the casing layer and cover and decrease the likelihood of delamination. These adhesion promoting processes increase the adhesion strength between layers and the overall durability of the golf ball but require expensive materials and additional steps in the manufacturing process, which increases manufacturing time and cost.

Thus, it would be advantageous to have compositions for use in the casing and cover layers of golf balls that improve the durability of the golf ball while still providing desirable playing properties and without the need for additional materials or manufacturing steps. The present invention provides such compositions and golf balls including components made with such compositions.

SUMMARY OF THE INVENTION

The present invention relates to a golf ball, including: a core; a casing layer disposed on the core, the casing layer formed from a casing composition including carboxyl groups; and a cover disposed on the casing layer, the cover formed from a cover composition including a base polymer and adhesion promoter, wherein the cover composition includes functional groups crosslinked with the carboxyl groups. In some embodiments, the adhesion promoter is included in the cover composition in an amount of about 0.1 percent to about 5 percent by weight. The adhesion promoter may include an organic silane. In some embodiments, the adhesion promoter includes a mono reactive silane. In other embodiments, the adhesion promoter includes a dual reactive silane. In still other embodiments, the golf ball has an adhesion strength between the casing layer and cover, and wherein the adhesion strength ranges from about 5 lb/in to about 30 lb/in. In yet other embodiments, the adhesion strength ranges from about 15 lb/in to about 30 lb/in.

In some embodiments, the base polymer is selected from the group consisting of polyurethanes, polyureas, and hybrids, copolymers, and blends thereof. In other embodiments, the core includes a rubber formulation including a base rubber, and wherein the base rubber is a polybutadiene rubber, butyl rubber, or a blend thereof. In still other embodiments, the casing composition includes an ionomer.

The present invention also relates to a golf ball, including: a core; a casing layer disposed on the core, the casing layer formed from a casing composition including an ionomer; and a cover disposed on the casing layer, the cover formed from a cover composition including a base polymer and adhesion promoter, wherein the adhesion promoter includes silane, wherein the casing layer and cover are crosslinked by one or more of the following linkage:

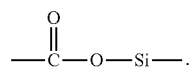

In some embodiments, the base polymer is selected from the group consisting of polyurethanes, polyureas, and hybrids, copolymers, and blends thereof. In other embodiments, the adhesion promoter is included in the cover composition in an amount of about 0.1 percent to about 5 percent by weight. In still other embodiments, the casing composition includes a moisture content of about 0.1 percent to about 5 percent by weight. In yet other embodiments, the percent by weight of moisture content in the casing composition is greater than the percent by weight of adhesion promoter in the cover composition.

The present invention further relates to a golf ball, including: a dual core including a center and an outer core layer disposed on the center; a casing layer disposed on the core, the casing layer formed from a casing composition including carboxyl groups; and a cover layer disposed about the casing layer, the cover layer formed from a composition including a base polymer and a silane, wherein the casing layer and cover layer are bonded by crosslinks between functional groups in the cover layer and carboxyl groups in the casing layer. In some embodiments, the casing composition includes an ionomer. In other embodiments, the at least one of the center and outer core layer includes a rubber formulation including a base rubber, wherein the base rubber is a polybutadiene rubber, butyl rubber, or a blend thereof. In still other embodiments, the crosslinks include the following linkage:

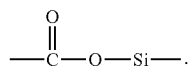

The present invention also relates to a golf ball, including: a core; a casing layer disposed on the core, the casing layer formed from a casing composition including an ionomer; and a cover disposed on the casing layer, the cover layer formed from a cover composition including a base polymer, a first adhesion promoter, and a second adhesion promoter, wherein the first adhesion promotor includes a monopodal silane and the second adhesion promoter includes a dipodal silane. In some embodiments, the first adhesion promoter is included in the cover composition in a first concentration, wherein the second adhesion promoter is included in cover composition in a second concentration, and wherein the first concentration is greater than the second concentration. In other embodiments, the first concentration is about 0.2 percent to about 5 percent by weight and the second concentration is about 0.1 to about 2.5 percent by weight. In still other embodiments, the ratio of the first concentration to the second concentration is about 20:1 to about 2:1. In yet other embodiments, the ratio of the first concentration to the second concentration is about 15:1 to about 3.75:1.

The first adhesion promoter may include a mono reactive, monopodal silane and the second adhesion promoter may include a dual reactive, dipodal silane. In other embodiments, the first adhesion promoter includes a dual reactive, monopodal silane and the second adhesion promoter includes a mono reactive, dipodal silane. In still other embodiments, the first adhesion promoter includes a mono reactive, monopodal silane and the second adhesion promoter includes a mono reactive, dipodal silane. In yet other embodiments, the first adhesion promoter includes a dual reactive, monopodal silane and the second adhesion promoter includes a dual reactive, dipodal silane.

In this aspect, the base polymer may be a material selected from the group consisting of polyurethanes, polyureas, and hybrids, copolymers, and blends thereof. In one embodiment, the core includes a rubber formulation including a base rubber, and wherein the base rubber is a polybutadiene rubber, butyl rubber, or a blend thereof.

The present invention also relates to a golf ball, including: a core; a casing layer disposed on the core, the casing layer formed from a casing composition including carboxyl groups; and a cover disposed on the casing layer, the cover layer formed from a cover composition including a base polymer, a first adhesion promoter, and a second adhesion promoter, wherein the cover includes functional groups crosslinked to the carboxyl groups, wherein the first adhesion promotor includes a monopodal silane and the second adhesion promoter includes a dipodal silane. In some embodiments, the first adhesion promoter is included in the cover composition in a first concentration, wherein the second adhesion promoter is included in cover composition in a second concentration, and wherein the first concentration is greater than the second concentration. In other embodiments, the first concentration is about 0.2 percent to about 5 percent by weight and the second concentration is about 0.1 to about 2.5 percent by weight.

The present invention also relates to a golf ball, including: a core; a casing layer disposed on the core, the casing layer formed from a casing composition including an ionomer; and a cover disposed on the casing layer, the cover layer formed from a cover composition including a base polymer, a first adhesion promoter, and a second adhesion promoter, wherein the first adhesion promotor includes a monopodal silane and the second adhesion promoter includes a dipodal silane, and wherein the casing layer and cover are crosslinked by one or more of the following linkage:

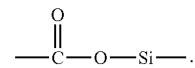

In some embodiments, the first adhesion promoter is included in the cover composition in a first concentration, wherein the second adhesion promoter is included in cover composition in a second concentration, and wherein the first concentration is greater than the second concentration. In other embodiments, the first concentration is about 0.2 percent to about 5 percent by weight and the second concentration is about 0.1 to about 2.5 percent by weight. In still other embodiments, the ratio of the first concentration to the second adhesion promoter concentration is about 20:1 to about 2:1. In yet other embodiments, the first concentration is about 0.2 percent to about 5 percent by weight and the second concentration is about 0.1 to about 2.5 percent by weight. In other embodiments, the first adhesion promoter includes a dual reactive, monopodal silane and the second adhesion promoter includes a mono reactive, dipodal silane.

The present invention also relates to a method of forming a golf ball, including the steps of:
- providing a core;
- disposing a casing layer on the core, wherein the casing layer is formed from a casing composition including carboxyl groups and has a first moisture content;
- applying moisture to the casing layer to form a treated casing layer having a second moisture content that is greater than the first moisture content; and
- forming a cover on the treated casing layer, wherein the cover is formed from a cover composition including a base polymer and an adhesion promoter, wherein the cover includes functional groups,
- wherein, after the step of forming the cover, the functional groups are crosslinked with the carboxyl groups.

In some aspects, the second moisture content is about 0.1 percent to about 5 percent by weight. In other aspects, the step of applying moisture to the casing layer includes storing the casing layer at a relative humidity of about 50 percent to about 100 percent. In still other aspects, the casing layer includes an exterior surface, and wherein the step of applying moisture to the casing layer includes applying liquid water to the exterior surface of the casing layer. In yet other aspects, the method further includes the step of heating the casing layer, and wherein the step of applying moisture to the casing layer is performed simultaneously with or after the step of heating the casing layer. In some embodiments, the adhesion promoter includes an organic silane. In other embodiments, the adhesion promoter includes a dual reactive silane. In still other embodiments, the adhesion promoter includes a mono reactive silane. The base polymer may be polyurethane and the casing composition may include ionomer.

The present invention also relates to a method of forming a golf ball, including the steps of:
  providing a core;
  disposing a casing layer on the core, wherein the casing layer has a first moisture content and is formed from an ionomer composition including carboxyl groups;
  treating the casing layer to form a treated casing layer having a second moisture content that is greater than the first moisture content; and
  forming a cover over the treated casing layer, wherein the cover is formed from a composition including a base polymer, a first adhesion promoter, and a second adhesion promoter, and wherein the cover includes functional groups bond with the carboxyl groups.

In some embodiments, the first adhesion promotor includes a monopodal silane and the second adhesion promoter includes a dipodal silane. In other embodiments, the first adhesion promoter is included in the cover composition in a first concentration, wherein the second adhesion promoter is included in cover composition in a second concentration, and wherein the first concentration is greater than the second concentration. In still other embodiments, the first concentration is about 0.2 percent to about 5 percent by weight and the second concentration is about 0.1 to about 2.5 percent by weight. In yet other embodiments, the ratio of the first concentration to the second concentration is about 15:1 to about 3.75:1. In some aspects, the first adhesion promoter may include a dual reactive, monopodal silane and the second adhesion promoter may include a mono reactive, dipodal silane.

The present invention further relates to a method of forming a golf ball, including the steps of:
  providing a core;
  disposing a casing layer on the core, wherein the casing layer is formed from a casing composition including carboxyl groups and has a first moisture content;
  treating the casing layer to form a treated casing layer having a second moisture content that is greater than the first moisture content; and
  forming a cover on the treated casing layer, wherein the cover is formed from a cover composition including a base polymer, a first adhesion promoter, and a second adhesion promoter, wherein the cover includes functional groups that crosslink with the carboxyl groups.

In some embodiments, the first adhesion promotor includes a monopodal silane and the second adhesion promoter includes a dipodal silane. In other embodiments, the first adhesion promoter is included in the cover composition in a first concentration of about 0.2 percent to about 5 percent by weight, the second adhesion promoter is included in cover composition in a second concentration of about 0.1 to about 2.5 percent by weight, and the first concentration is greater than the second concentration. In still other embodiments, the second moisture content is about 0.1 percent to about 5 percent by weight. In yet other embodiments, the step of treating the casing layer includes storing the casing layer at a relative humidity of about 50 percent to about 100 percent. In still other embodiments, the step of treating the casing layer includes applying liquid water to an exterior surface of the casing layer.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
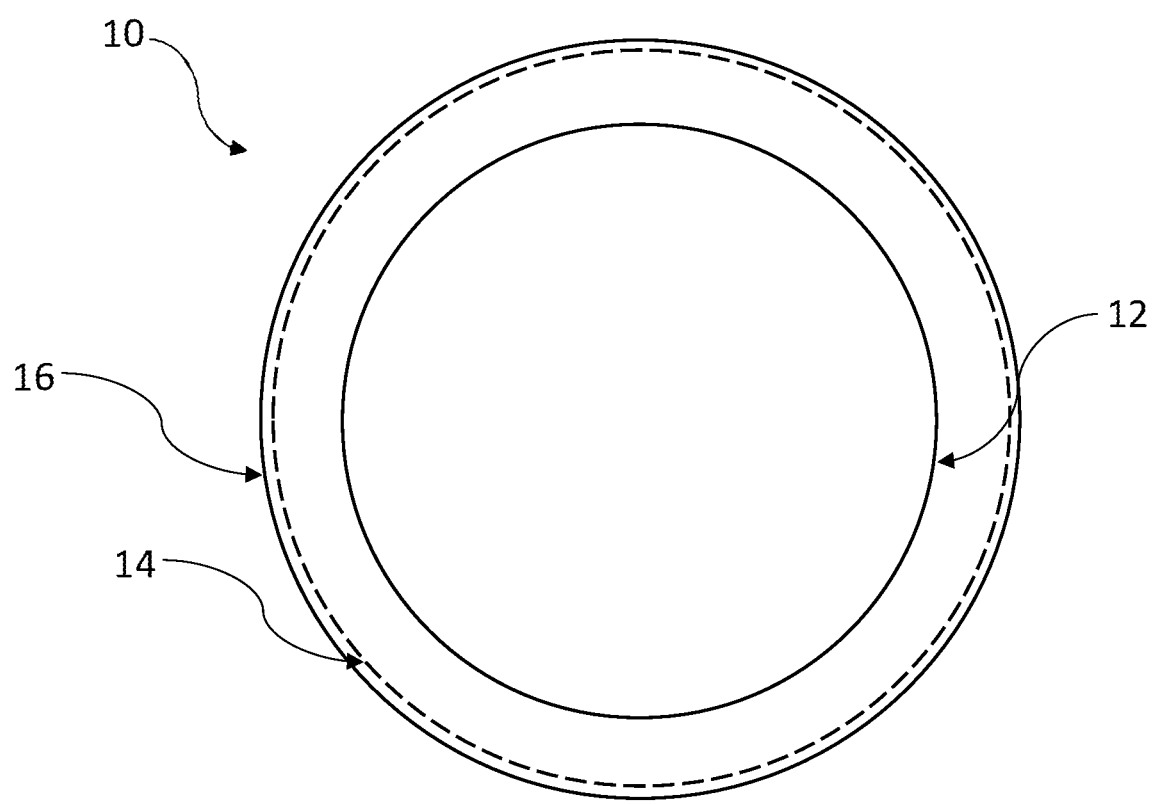
FIG. 1 is a cross-sectional view of a three-piece golf ball assemblage in accordance with an embodiment of the present disclosure.

The present disclosure relates to compositions and methods that may be used to produce multi-layer golf balls. More specifically, the casing and cover compositions of the present disclosure may be used to form a casing and cover layers of a golf ball. The compositions and methods described herein may result in golf balls with improved shear durability and increased adhesion between layers (as compared to golf balls that do not include the components formed from compositions of the present disclosure. The casing and cover compositions and the components and golf balls formed therefrom are discussed in more detail below.

Cover Compositions

Golf balls of the present invention may have a single or multi-layered cover. As discussed in more detail below, one or more layers of the cover may be formed from a composition including a base polymer and one or more other components. Concentrations of components are in weight percent (wt %) unless otherwise indicated. As used herein, the term, "weight percent," also known as "percent by weight" or "wt %" is defined as the weight of a particular component present in a mixture, relative to the weight of the mixture as a whole. Mathematically, this can be expressed as the weight of an ingredient divided by the total weight of the mixture, multiplied by a factor of 100.

The base polymer may be a variety of materials depending on the desired characteristics and performance of a golf ball having a cover including the base polymer. Examples of materials suitable for use as the base polymer include, but are not limited to, polyurethanes; polyureas; copolymers, blends and hybrids of polyurethane and polyurea; polyethylene, including, for example, low density polyethylene, linear low density polyethylene, and high density polyethylene; polypropylene; rubber-toughened olefin polymers; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, and poly(amide-ester) elastomers; crosslinked trans-polyisoprene and blends thereof; polyester-based thermoplastic elastomers; polyurethane-based thermoplastic elastomers; synthetic or natural vulcanized rubber; ethylene acid copolymers, such as ethylene/(meth)acrylic acid, ethylene/(meth) acrylic acid/maleic anhydride, ethylene/(meth)acrylic acid/ maleic acid mono-ester, ethylene/maleic acid, ethylene/ maleic acid mono-ester, ethylene/(meth)acrylic acid/n-butyl (meth)acrylate, ethylene/(meth)acrylic acid/iso-butyl (meth) acrylate, ethylene/(meth)acrylic acid/methyl (meth)acrylate, ethylene/(meth)acrylic acid/ethyl (meth)acrylate terpolymers; and combinations thereof. In some embodiments, the ethylene acid copolymers may be partially-neutralized. In this aspect, any of the partially-neutralized ethylene acid copolymers discussed below with respect to the casing layer may also be used as a base polymer for the cover.

In one embodiment, the cover is formed from a polyurethane, polyurea, or hybrid of polyurethane-polyurea. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In some embodiments, the base polymer may be included in the cover composition in an amount of about 90 to about 100 percent by weight. In one embodiment, the base polymer is included in the cover composition in an amount of about 90 percent to about 99.9 percent or about 92 percent to about 97 percent or about 90 percent to about 95 percent or about 93 percent to about 95 percent or about 90 percent to about 93 percent or about 92 percent to about 94 percent by weight base polymer. In another embodiment, the base polymer is included in the cover composition in an amount of about 95 percent to about 99.9 percent or about 96 percent to about 99 percent or about 95 percent to about 98 percent or about 97 percent to about 99 percent. In a further embodiment, the base polymer may be included in the cover composition in an amount of about 96 percent to about 99.9 percent or about 97 percent to about 99.9 percent or about 98 percent to about 99.9 percent or about 99 to about 99.9 percent or about 98 to about 99.5 percent or about 98 percent to about 99 percent or about 98.5 to about 99.5 percent base polymer.

The cover composition of the present disclosure may include an adhesion promoter. Without being bound to any particular theory, the adhesion promoter may provide a gateway for the formation of functional groups that create one or more chemical bonds with one or more free carboxyl groups in the compositions used to form the casing layer. Without being bound to any particular theory, the bonds formed between the functional groups in the adhesion promoter and the free carboxyl groups in the casing layer increase the adhesion of the cover layer to an intermediate layer such as the casing layer.

In some embodiments, the adhesion promoter may be a silane. Suitable silanes for use in accordance with the present disclosure may vary in structure based on the desired characteristics of the golf ball. For example, suitable silanes may be aromatic or aliphatic in nature. Suitable silanes may also include organosilanes, which are silanes having Si—C bonds, or siloxanes. Suitable silanes may also be mono reactive or dual reactive silanes. As used herein, mono reactive silanes are organosilanes having only alkoxy silane groups and no other types of reactive groups. In contrast, dual reactive silanes are organosilanes having at least one hydrolysable functional group (e.g., alkoxy or acetoxy functional groups) and at least one non-hydrolysable functional group. The at least one hydrolysable functional group may be able to react with hydroxyl groups in a mineral or polymer and liberate alcohols or acetic acids, for example. The non-hydrolysable functional group may be organic and may be reactive toward other compounds such as amines, epoxies, vinyls, methacrylates, etc. Suitable silanes also include monopodal silanes, also referred to as "conventional" or "traditional" silanes, and dipodal silanes. Monopodal silanes are silanes having a hydrolysable group on only one end of the molecule (e.g., alkoxysilane). Dipodal silanes are silanes having hydrolysable groups on each end of the molecule (e.g., bis-alkoxysilane).

Non-limiting examples of silanes for use with the present invention include silane esters; vinyl silanes; methacryloxy silanes; epoxy silanes; sulfur silanes; amino silanes; ureido silanes; or a mixture thereof. Preferably, the silanes include silane esters, octyltriethoxysilane, methyltriethoxylsilane, methyltrimethoxysilane, nonionic silane dispersing agents; vinyl silanes, vinyltriethoxysilane, vinyltrimethoxysilane, vinyl-tris-(2-methoxyethoxy) silane, vinylmethyldimethoxysilane; methacryloxy silanes, γ-methacryloxypropyltrimethoxysilane; epoxy silanes, β-(3,4-epoxycyclohexyl) ethyltrimethoxysilane, γ-glycidoxypropyltrimethoxysilane; sulfur silanes, γ-mercaptopropyltrimethoxysilane proprietary polysulfidesilane, bis-(3-[triethoxysilyl]-propyl)-tetrasulfane; γ-aminopropyltriethoxysilane, aminoalkyl silicone solution, modified aminoorganosilanes, n-β-(aminoethyl)-γ-aminopropyltrimethoxysilane, modified aminoorganosilanes, modified aminosilanes, triaminofunctional silanes, bis-(γ-trimethoxysilylpropyl)amine, bis-(γ-triethoxysilylpropyl)amine, n-phenyl-γ-aminopropyltrimethoxysilane, organomodified polydimethylsiloxane, polyazamide silane, n-β-(aminoethyl)-γ-aminopropylmethyldimethoxysilane; ureido silanes, γ-ureidopropyltrialkoxysilane, γ-ureidopropyltrimethoxysilane; isocyanate silanes, γ-isocyanatopropyltriethoxysilane; or mixtures thereof.

The adhesion promoter may be included in the cover composition in varying amounts depending on the desired characteristics of the golf ball. In some embodiments, the adhesion promoter may be included in the cover composition in a concentration of about 0.1 to about 5.0 percent by weight. In one embodiment, the adhesion promoter is included in the cover composition in a concentration of about 0.1 percent to about 2.5 percent or about 2.5 percent to about 5.0 percent or about 1.0 percent to about 4.0 percent or about 2 percent to about 3 percent or about 0.5 to about 2.5 percent or about 0.5 percent to about 1.5 percent or about 1.0 percent to about 2.0 percent or about 0.5 percent to about 1.0 percent by weight adhesion promoter. In another embodiment, the adhesion promoter is included in the cover composition in a concentration of about 0.1 percent to about 4.5 percent or about 0.1 percent to about 4.0 percent or about 0.1 percent to about 3.0 percent or about 0.1 percent to about 2.0 percent or about 0.1 percent to about 1.0 percent or about 0.1 to about 0.5 by weight adhesion promoter. In a further embodiment, the adhesion promoter is included in the cover composition in a concentration of about 2.0 percent to about 5.0 percent or about 2.0 percent to about 4.0 percent or about 3.0 percent to about 5.0 percent or about 3.0 percent to about 4.0 percent or about 3.5 percent to about 4.5 percent or about 4.0 to about 5.0 by weight adhesion promoter.

In some embodiments, more than one type of adhesion promoter may be included in the cover composition, i.e., the cover composition may include a first adhesion promoter in a first adhesion promoter concentration and a second adhesion promoter in a second adhesion promoter concentration. In this aspect, the ratio of the first adhesion promoter concentration (in percent by weight) to the second adhesion promoter concentration (in percent by weight) may be about 20:1 to about 1:1. In some embodiments, the ratio of the first adhesion promoter concentration to the second adhesion promoter concentration may be about 20:1 to about 2:1 or about 15:1 to about 3:1 or about 15:1 to about 3.75:1 or about 12:1 to about 5:1 or about 10:1 to about 5:1. In other embodiments, the ratio of the first adhesion promoter concentration to the second adhesion promoter concentration may be about 15:1 to about 5:1 or about 15:1 to about 7:1 or about 15:1 to about 10:1 or about 15:1 to about 12:1 or about 13:1 to about 7:1 or about 10:1 to about 7:1. In further embodiments, the ratio of the first adhesion promoter concentration to the second adhesion promoter concentration may be about 10:1 to about 1:1 or about 7:1 to about 1:1 or about 5:1 to about 1:1 or about 5:1 to about 2:1 or about 7:1 to about 3:1 or about 5:1 to about 3.75:1.

In some embodiments, the first and second adhesion promoter may be silanes that are similar in nature. For example, the first and second adhesion promoter may both be organosilanes or may both be organosiloxanes. As another example, the first and second adhesion promoters may both be mono reactive silanes or dual reactive silanes. As another example, the first and second adhesion promoters may both be monopodal silanes or may both be dipodal silanes. In other embodiments, the first and second adhesion promoters may differ in nature. For example, the first adhesion promoter may be a mono reactive silane and the second adhesion promoter may be a dual reactive silane. As another example, the first adhesion promoter may be a monopodal silane, and the second adhesion promoter may be a dipodal silane. Without being bound to any particular theory, when both monopodal and dipodal silanes are included in the cover composition, the hydrolysable group on one end of the dipodal silane may bond with a functional group on the base polymer formed by the monopodal silane, and the hydrolysable group on the other end of the dipodal silane may formation of functional groups that create one or more chemical bonds with one or more free carboxyl groups in the composition used to form the casing layer.

The cover composition of the present disclosure may include a whitening agent. The whitening agent may include hydroxy-containing components, metal oxides, metal sulfides, metal sulfates, metal carbonates, or combinations thereof. For example, metal oxides such as titanium dioxide, zinc oxide, copper oxide, tin oxide, iron oxide, silicon dioxide, aluminum oxide, zirconium dioxide, and other metal oxides commonly known are suitable for use in accordance with the present disclosure. Non-limiting examples of polycarbonates suitable for use in accordance with the present disclosure include zinc carbonate, barium carbonate, and magnesium carbonate. Non-limiting examples of sulfates suitable for use in accordance with the present disclosure include calcium sulfate, barium sulfate, and magnesium sulfate. A non-limiting example of a sulfide suitable for use in accordance with the present disclosure is zinc sulfide. Without being bound to any particular theory, the adhesion promoter may form bonds with the whitening agent in the cover composition. An adhesion promoter bonded to the whitening agent may also react with a one or more free carboxyl groups in the compositions used to form the casing layer to cross link the casing layer and cover layer, as discussed below.

Casing Composition

Golf balls of the present disclosure may also include a casing layer disposed between the core and the cover layer. The casing layer may also be referred to as an intermediate layer, outer core layer, inner cover layer, or mantle layer. As discussed in more detail below, one or more layers of the cover may include a casing composition including an ionomer.

In this aspect, ionomers suitable for use in accordance with the present disclosure may include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized.

Preferred ionomers are salts of O/X- and O/X/Y-type acid copolymers, wherein O is an α-olefin, X is a C3-C8 α, β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α, B-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a C3-C8 α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth)

acrylic acid/n-butyl acrylate, ethylene/(meth) acrylic acid/ methyl acrylate, and ethylene/(meth) acrylic acid/ethyl acrylate.

The amount of ethylene in the acid copolymer may be at least about 15 weight percent, at least about 25 weight percent, at least about 40 weight percent, or at least about 60 weight percent, based on total weight of the copolymer. The amount of C3 to C8 α, β-ethylenically unsaturated mono- or dicarboxylic acid in the acid copolymer is typically from 1 weight percent to 35 weight percent, from 5 weight percent to 30 weight percent, from 5 weight percent to 25 weight percent, or from 10 weight percent to 20 weight percent, based on total weight of the copolymer. The amount of optional softening comonomer in the acid copolymer may be from 0 weight percent to 50 weight percent, from 5 weight percent to 40 weight percent, from 10 weight percent to 35 weight percent, or from 20 weight percent to 30 weight percent, based on total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to 100 percent or greater, for example 110 percent or 120 percent or greater. In other embodiments, partially-neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

"Low acid" and "high acid" ionomeric polymers, as well as blends of such ionomers, may be used. In general, low acid ionomers are considered to be those containing 16 weight percent or less of acid moieties, whereas high acid ionomers are considered to be those containing greater than 16 weight percent of acid moieties. In one embodiment, the inner cover layer is formed from a composition including a high acid ionomer. A suitable high acid ionomer is Surlyn® 8150 (Dow), which is a copolymer of ethylene and methacrylic acid, having an acid content of 19 weight percent, 45 percent neutralized with sodium. In another embodiment, the inner cover layer is formed from a composition including a high acid ionomer and a maleic anhydride-grafted non-ionomeric polymer. An example of a suitable maleic anhydride-grafted polymer is Fusabond® 525D (Dow), which is a maleic anhydride-grafted, metallocene-catalyzed ethylene-butene copolymer having about 0.9 weight percent maleic anhydride grafted onto the copolymer. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition including a 50/45/5 blend of Surlyn® 8940/Surlyn® 9150/Nucrel® 960. In this aspect, the composition may have a material hardness of from 80 to 85 Shore C. In another embodiment, the inner cover layer is formed from a composition including a 50/25/25 blend of Surlyn® 8940/Surlyn® 9150/Surlyn® 9910, having a material hardness of about 85 to 95 Shore C. In yet another embodiment, the inner cover layer is formed from a composition including a 50/50 blend of Surlyn® 8940/Surlyn® 9150, having a material hardness of about 82 to 90 Shore C. A composition including a 50/50 blend of Surlyn® 8940 and Surlyn® 7940 also may be used.

While the casing composition may be formed of the materials provided in this section, the composition may also be formed of any suitable composition useful in forming casing layers provided that such composition includes functional groups that are able to react/crosslink with functional groups in the cover composition. In one embodiment, the casing composition includes one or more free carboxyl groups.

Crosslinking the Casing and Cover Layers

As briefly discussed above, the adhesion promoter facilitates bonding between functional groups in the cover composition and free carboxyl groups in the casing composition. Without being bound to any particular theory, the bonding between the functional groups in the compositions used to form the casing and cover layers of the present disclosure help to increase adhesion between the casing and cover layers (as compared to casing and cover layers made from conventional compositions).

In some embodiments, the functional group in the cover composition has the connectivity Si—O—H. This first functional group may bond with free carboxyl groups in the casing composition. For example, when the adhesion promoter of the cover layer is a silane, the silane may, under certain conditions discussed in more detail below, hydrolyze into a silanol. The silanol may then undergo a condensation reaction with a carboxyl group in the casing composition to form crosslinks between the casing layer and cover layer. In particular, the casing layer and cover layer become crosslinked by the following linkage:

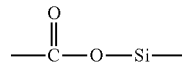

The number of crosslinks between the casing and cover layers may depend on the type and amount of adhesion promoter used in the casing layer, the type and amount of ionomer used in the cover layer, the time allowed for crosslinks to form, and the amount of moisture added to the casing layer, as discussed below.

The casing layer may also have a moisture content. Without being bound to any particular theory, the moisture content of the casing layer promotes the hydrolysis of the adhesion promoter, which may then undergo a condensation reaction with free carboxyl groups in the cover composition when the cover layer is cast around the casing layer. Particularly, when the adhesion promoter is a silane, the moisture content of the casing layer causes the hydrolysis of silane molecules into silanol molecules, which ultimately facilitates the reaction of the silanol molecules with the carboxyl groups of the ionomer in the casing layer. As such, the moisture content of the casing layer may ultimately affect the adhesion between the casing layer and the cover layer. For example, a lower moisture content in the casing layer may result in less or insufficient hydrolysis of silane into silanol in the cover layer, which, in turn, may result in a lesser degree or insufficient bonding between the casing layer and cover layer. A higher moisture content in the casing layer may cause the silane in the casing layer to hydrolyze into silanol and subsequently self-polymerize, which, in turn, may also result in insufficient bonding between the casing layer and the cover layer. Accordingly, it is desirable to optimize the moisture content in the casing layer to promote sufficient bonding between the core layer and casing layer. The desired moisture content may vary based on, among other things, the type and amount of adhesion promoter included in the cover compositions.

In some embodiments, the moisture content of the casing layer may range from about 0.01 percent to about 1.5 percent by weight of the casing composition. For example, in some embodiments, the moisture content of the casing layer may be about 0.01 to about 1.5 percent or about 0.1 to about 1.2 percent or about 0.1 percent to about 1.0 percent or about 0.1 percent to about 0.7 percent or about 0.01 percent to about 0.5 percent or about 0.1 percent to about 0.5 percent or about 0.1 to about 0.3 percent or about 0.3 percent to about 0.5 percent or about 0.3 percent to about 0.7 percent or about 0.5 percent to about 1.0 percent by weight. In another embodiment, the moisture content of the casing layer may be about 0.5 percent to about 1.5 percent or about 0.5 percent to about 1.2 percent or about 0.7 percent to about 1.5 percent or about 0.7 percent to about 1.2 percent or about 1.0 percent to about 1.5 percent or about 1.2 to about 1.5 percent by weight.

To produce a casing layer having a desired moisture content, golf balls made in accordance with the present disclosure, and particularly, cased cores, i.e., partially assembled golf balls including a core assemblage and a casing layer disposed around the core assemblage, may be treated with moisture during production to increase the moisture content of the casing layer to a desired amount. As an example, in some embodiments, a method of producing a golf ball in accordance with the present disclosure includes the step of providing a core. The method may also include the step of disposing a casing layer on the core. The casing layer may be formed from a casing composition of the present disclosure. For example, the casing composition may include an ionomer. The casing layer may have a first moisture content. In some embodiments, the first moisture content may be a negligible amount of moisture or no moisture. In other embodiments, the first moisture content may be less than 1.0 percent by weight or less than 0.5 percent by weight or less than 0.1 percent by weight. The method may further include the step of applying moisture to the core to form a treated casing layer having a second moisture content that is greater than the first moisture content. The step of applying moisture to the casing layer is discussed in more detail below.

The method may further include the step of forming a cover on the treated casing layer. The cover may be formed from a cover composition of the present disclosure. For example, the cover composition may include a base polymer and adhesion promoter, such as a silane. In some embodiments, the cover may be formed on the casing layer promptly after the step of applying moisture to the casing layer to prevent the moisture content of the casing layer from decreasing prior to the cover layer being formed. For example, the cover layer may be formed on the cover layer within about 1 to about 5 minutes, about 1 to about 3 minutes, about 1 to about 2 minutes, about 2 to about 4 minutes, about 3 to about 5 minutes, about 2 to about 3 minutes, about 3 to about 4 minutes, or about 4 to about 5 minutes of applying moisture to the casing layer.

In some embodiments, the step of applying moisture to the casing layer includes storing the casing layer or cased core in an environment having a relatively high humidity. The level of increase in the moisture content of the casing layer that results from storing the casing layer in the humid environment is a function of the temperature and relative humidity of the humid environment as well as the amount of time that the casing layer is stored in the humid environment. An increase in one or more of the relative humidity of the humid environment, the temperature of the humid environment, or the time that the casing layer is stored in the humid environment (holding all of the other variables constant) may allow for higher moisture contents to be achieved in the casing layer or may reduce the amount of time needed to achieve a desired moisture content in the casing layer. Without being bound to any particular theory, storing the casing composition in a humid environment may cause moisture to condense onto the exterior surface of the casing layer and/or cause moisture to absorb into the casing layer. In some embodiments, the moisture content of the casing layer may increase near the exterior surface of the casing layer, which helps to facilitate crosslinking between the casing and cover layers at the interface between the casing and cover layers.

The relative humidity of the humid environment in which the casing layer is stored may vary depending on the desired moisture content of the casing layer, the temperature of the humid environment, and the time for which the casing layer is stored in the humid environment. In some embodiments, a casing layer in accordance with the present disclosure may be stored in a humid environment having a relative humidity within the range of about 25 percent to about 100 percent or about 25 percent to about 75 percent or about 50 percent to about 100 percent or about 75 to about 100 percent. In other embodiments, a casing layer in accordance with the present disclosure may be stored in a humid environment having a relative humidity in the range of about 50 percent to about 80 percent or about 70 percent to about 100 percent or about 60 percent to about 90 percent or about 75 to about 95 percent or about 80 percent to about 100 percent or about 90 percent to about 100 percent or about 95 percent to about 100 percent.

As the moisture content of air at a given relative humidity varies with temperature, the temperature of the humid environment in which the casing layer is stored also affects the increase in the moisture content of the casing layer. The temperature of the humid environment in which the casing layer is stored may vary depending on the desired moisture content of the casing layer, the temperature of the humid environment and the time for which the casing layer is stored in the humid environment. In some embodiments, a casing layer in accordance with the present disclosure may be stored in humid environment having a temperature within the range of about 70° F. to about 170° F. or about 90° F. to about 170° F. or about 70° F. to about 150° F. or about 90° F. to about 150° F. In other embodiments, a casing layer in accordance with the present disclosure may be stored in humid environment having a temperature within the range of about 70° F. to about 120° F. or about 70° F. to about 100° F. or about 90° F. to about 120° F. or about 80° F. to about 110° F. In further embodiments, a casing layer in accordance with the present disclosure may be stored in humid environment having a temperature within the range of about 120° F. to about 170° F. or about 120° F. to about 150° F. or about 140° F. to about 170° F. or about 130° F. to about 160° F.

The time in which the casing layer is stored in the humid environment may vary depending on the desired moisture content of the casing layer as well as the temperature and relative humidity of the humid environment. In some embodiments, a casing layer in accordance with the present disclosure may be stored in humid environment for about 5 minutes to about 60 minutes or about 5 minutes to about 45 minutes or about 15 minutes to about 60 minutes or about 15 minutes to about 45 minutes or about 20 minutes to about 40 minutes. In other embodiments, a casing layer in accordance with the present disclosure may be stored in humid environment for about 5 minutes to about 30 minutes or about 10 to about 30 minutes or about 5 minutes to about 15 minutes or about 15 minutes to about 30 minutes. In further embodiments, a casing layer in accordance with the present disclosure may be stored in humid environment for about 30 minutes to about 60 minutes or about 30 minutes to about 50 minutes or about 40 minutes to about 60 minutes or about 30 minutes to about 45 minutes or about 45 minutes to about 60 minutes.

In other embodiments, the step of applying moisture to the casing layer includes applying liquid water to the cased core or casing layer to increase the moisture content of the casing layer. In some embodiments, liquid water is applied by spraying or misting water onto the exterior surface of the casing layer. In other embodiments, liquid water is applied to exterior surface of the casing layer by dipping or submerging the cased core in a pool of water. The amount of liquid water applied to the casing layer may depend on the desired moisture content of the casing composition of the casing layer. In some embodiments, the liquid water applied to the casing layer may be sufficient to saturate the exterior surface of the casing layer, i.e., the amount of water on the exterior surface of the casing layer is such that applying more water to the exterior surface of the casing layer results in water dripping or otherwise coming off of the exterior surface of the casing layer. In other embodiments, the liquid water applied to the casing layer is not enough to saturate the exterior surface of the casing layer. In some embodiments, the method may further include the step of heating the casing layer. In such embodiments, liquid water is applied to the casing layer while the casing layer is being heated or promptly after the casing layer is heated.

Golf Balls

Golf balls formed in accordance with the present disclosure include at least a core, a casing layer, and a cover. Without being bound to any particular theory, since the casing and cover compositions of the disclosure layer promote adhesion between layers, golf balls made using the casing and cover compositions of the present disclosure are more durable than conventional golf balls without any sacrifices in performance or processability. In some embodiments, golf balls formed in accordance with the present disclosure have a cover layer formed from a cover composition of the present disclosure and a casing layer formed from a casing composition of the present disclosure.

Figure 2:
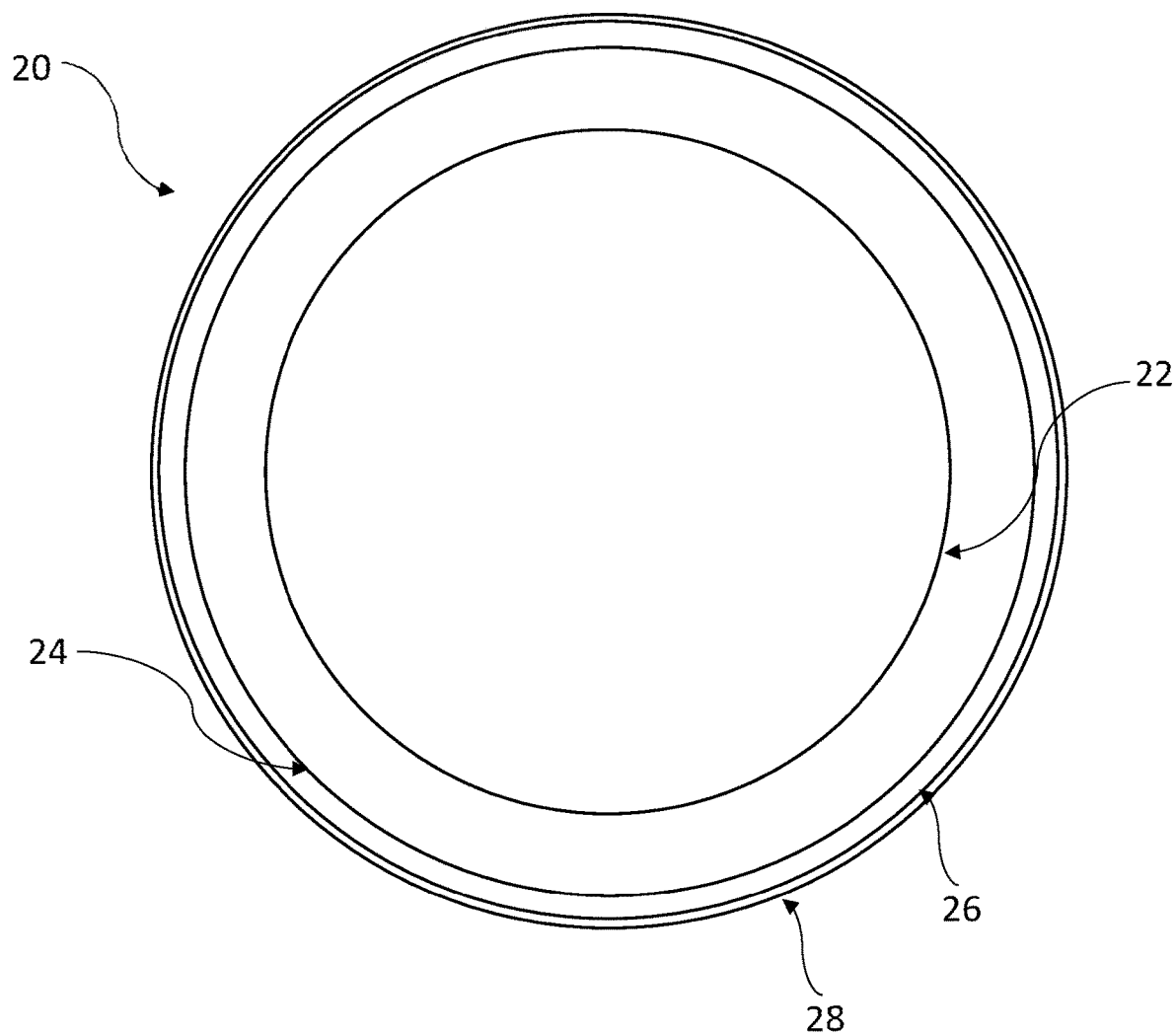
FIG. 2 is a cross-sectional view of a four-piece golf ball in accordance with an embodiment of the present disclosure.
Figure 3:
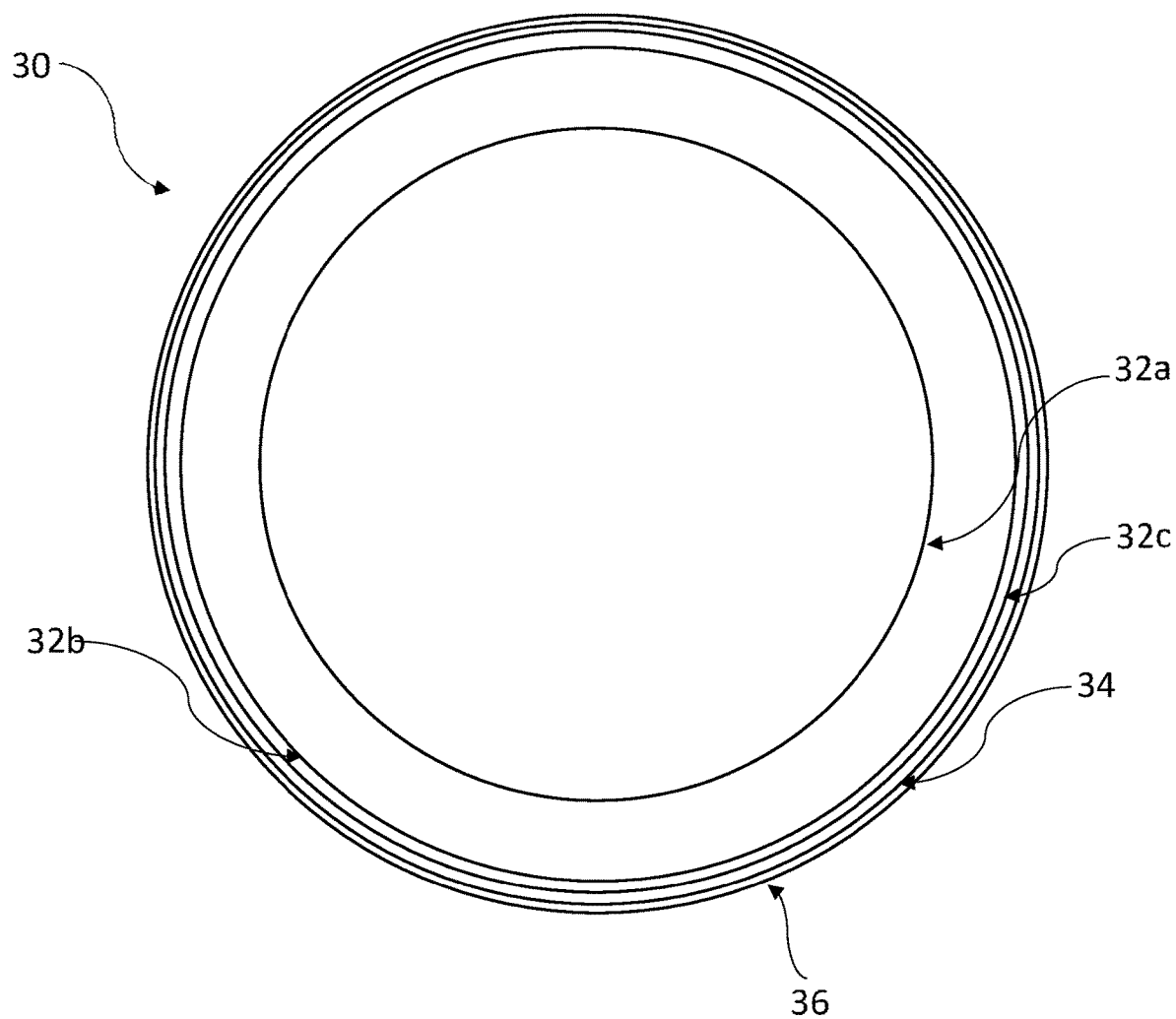
FIG. 3 is a cross-sectional view of a five-piece golf ball in accordance with an embodiment of the present disclosure.

Referring to FIG. 1, in one version, a three-piece golf ball 10 can be made in accordance with this invention. The ball 10 contains a core 12, a cover 16, and a casing layer 14 disposed between the core 12 and the cover 16. Referring to FIG. 2, in one version, a four-piece golf ball 20 can be made in accordance with this invention. The ball 20 contains a center 22, an outer core layer 24, a cover 28, and a casing layer 26 disposed between the outer core layer 24 and the cover 28. Referring to FIG. 3, in another version, a five-piece golf ball 30 contains a core 32 including a center 32a, an outer core layer 32c, and an inner core layer 32b disposed between the center 32a and the outer core layer 32c, a cover 36, and a casing layer 34 disposed between the core 32 and the cover 36. In any of these embodiments, the casing layer 14, 26, and 34 may be considered to be or referred to as an intermediate layer, mantle layer, or inner cover layer, or any other layer disposed between the core assemblage and the outer cover of the ball. In any of these embodiments, the cover 16, 28, or 36 may be formed from a cover composition of the present disclosure. Similarly, in any of these embodiments, the casing layer 14, 26, or 34 may be formed from a casing composition of the present disclosure.

While the casing and cover compositions discussed above are suitable for use in golf ball casing and cover layers, respectively, it is also contemplated that the casing and cover compositions formed in accordance with the present disclosure may be used to form one or more other layers of any of the one, two, three, four, or five, or more-piece (layered) balls described above. That is, any of the core layers, intermediate layers, and/or cover layers may be formed from the casing or cover compositions of this disclosure provided that at least one layer formed from a casing composition and one layer formed from a cover composition are adjacent to each other. In some embodiments, a layer formed from the casing composition of the present disclosure can be disposed between two layers formed from cover compositions of the present disclosure. For example, in an embodiment of a four-piece golf ball having a center, an outer core layer, a cover, and a casing layer disposed between the outer core layer and the cover, the casing layer may be formed from a casing composition of this disclosure and the outer core layer and/or the cover may be formed from a cover composition in accordance with the present disclosure. In other embodiments, a layer formed from a cover composition of the present disclosure can be disposed between two layers formed from casing compositions of the present disclosure. For example, in another embodiment of a four-piece golf ball having a center, an outer core layer, a cover, and a casing layer disposed between the outer core layer and the cover, the casing layer may be formed from a cover composition of this disclosure and the outer core layer and/or the cover may be formed from a cover composition in accordance with the present disclosure. When a two or more layers are composed of a casing composition or of a cover composition of the present disclosure, the composition of such layers may be the same or different. As when used in the casing and cover layers, using the casing and cover compositions of the present disclosure in other adjacent layers of a golf ball promotes adhesion between such layers and increases the durability of a golf ball made with such layers.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In another embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inch to about 1.60 inch. In one embodiment, the core has a diameter of about 1.52 inch to about 1.58 inch. In another embodiment, the core diameter ranges from about 1.54 inch to about 1.56 inch.

When a cover layer of a golf ball formed in accordance with the present disclosure is not formed of a cover composition, such layer(s) may be formed from a variety of materials including any of the base polymers discussed above in the context of the cover composition, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; crosslinked trans-polyisoprene and blends thereof; polyester-based thermoplastic elastomers; polyurethane-based thermoplastic elastomers; synthetic or natural vulcanized rubber; and combinations thereof.

Likewise, when layers outside of the core are not formed of a casing or cover composition of the present disclosure, conventional and non-conventional materials may be used for forming such layer(s) of the ball including, for instance, any of the ionomer resins discussed above, highly neutralized polymers, polybutadiene, butyl rubber, and other rubber-based formulations, and the like.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a casing layer disposed on the core formed from a casing composition of the present disclosure, and a cover formed from a cover composition of the present disclosure, and the cover has a hardness that is less than that of the casing layer. For example, the casing layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the casing layer is formed of a cover composition of the present disclosure and the cover is formed of a casing composition. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness.

When a dual cover is disposed about the core, the casing layer may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.750 and more preferably at least 0.800 (as measured per the test methods below). Such COR allows players to generate greater ball velocity off the tee and achieve greater distance with their drives. At the same time, a golf ball including a cover of a cover composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of a shear stress to that golf ball, is preferably comparable or greater than a golf ball formed with a conventional casing layer and cover. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

TABLE 1

Shear Durability Rating Scale

| Rating | Cut/Damaged Cover | Abrasion Type Damage | Paint Damage |
|---|---|---|---|
| 1 | Cut or Cracked Cover with casing layer exposed | | |
| 2 | Severe cover damage with multiple groove marks and deep gouges | | |
| 3 | Moderate cover damage with more than one groove mark, missing or severely raised cover material | | |

TABLE 1-continued

Shear Durability Rating Scale

| Rating | Cut/Damaged Cover | Abrasion Type Damage | Paint Damage |
|---|---|---|---|
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one hit is made on each of about 6 to 12 substantially identical golf balls of substantially the same composition with either a sand wedge or a pitching wedge. After a suitable calibration procedure, each experimental golf ball may be tested and assigned a rating based upon visible manifestations of damage after being struck. The shear durability rating for a golf ball with a particular cover represents a numerical average of all the tested substantially identical golf balls. An alternative way to test shear resistance of a golf ball cover involves using player-testing and evaluating the results after the ball is struck multiple times with wedges and/or short irons.

Exposing a golf ball to a high moisture environment, such as by soaking the golf ball or storing the golf ball in high humidity for an extended period, may decrease the durability of a golf ball. Accordingly, in some testing procedures, the golf balls may be soaked in water or stored at a high humidity for an extended period prior to testing each golf ball in order to simulate the durability of the golf ball over an extended period of time or in extreme conditions.

In one embodiment, a golf ball formed in accordance with the present disclosure, i.e., with a cover formed of a cover composition and a casing layer formed of a casing composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover formed of a cover composition and a casing layer formed of a casing composition as disclosed herein, has a shear durability rating of at least 8.

In some aspects, the shear durability of a golf ball formed in accordance with the present invention, i.e., with a cover formed of a cover composition and a casing layer formed of a casing composition as disclosed herein, is comparable to or better than a golf ball with a conventional casing layer and cover (holding all of the other ball components constant). In one embodiment, the shear durability of a golf ball formed in accordance with the present invention, i.e., with a cover formed of a cover composition and a casing layer formed of a casing composition as disclosed herein, is about 102 percent or more of the shear durability of a golf ball with a conventional casing layer and cover (holding all of the other ball components constant). In another embodiment, the shear durability of a golf ball formed in accordance with the present invention, i.e., with a cover formed of a cover composition and a casing layer formed of a casing composition as disclosed herein, is about 105 percent or more of the shear durability of a golf ball with a conventional casing layer and cover (holding all of the other ball components constant). In still another embodiment, the shear durability of a golf ball formed in accordance with the present invention, i.e., with a cover formed of a cover composition and a casing layer formed of a casing composition as disclosed herein, is about 110 percent or more of the shear durability of a golf ball with a conventional casing layer and cover (holding all of the other ball components constant).

The adhesion strength between a cover layer formed from a cover composition of the present disclosure and a casing layer formed of a casing composition of the present disclosure is preferably comparable or greater than the adhesion strength of a casing and cover layer of a golf ball formed with conventional compositions. The adhesion strength between two layers of a golf ball is the force required to separate the two layers. As used herein, the adhesion strength is preferably measured using a finished golf ball having a cover layer formed from the cover compositions of the present disclosure that is disposed on a casing layer formed from the casing composition of the present disclosure. However, the adhesion strength of a golf ball of the present disclosure may be measured using subassemblies of the golf ball, such as a casing layer disposed on a golf ball core, or other layers composed any of the compositions as disclosed herein. For example, the adhesion strength may be measured using a finished golf ball having cover made from the casing composition and a casing layer made from the cover composition.

Skilled artisans are aware of methods to determine the adhesion strength. One commonly used test for measuring adhesion strength is the repeated ball impact test. The repeated impact test consists of subjecting the finished golf ball to impact repeatedly and visually examining the coating film for peeling from the golf ball. To make the repeated ball impact test reproducible, the test may be carried out using a pneumatic cannon or similar device to propel the balls a 125 feet per second against a rigid wall at an angled of 45 degrees relative to the wall. The ball may be impacted in this manner 100, 200, or 300 or more times depending on the desired level of testing.

When golf balls are formed with the casing and cover compositions of the present disclosure, there are preferably no cracks or crazes after about 100 hits or more. In one embodiment, the casing and cover compositions of the present disclosure prevent cracks or crazes until after about 200 hits or more. In still another embodiment, golf balls formed with the casing and cover compositions of the present disclosure do not have any cracks or crazes until after about 300 hits or more. In yet another embodiment, golf balls formed with the casing and cover compositions of the present disclosure do not have any cracks or crazes until after about 600 hits or more.

Another common test for measuring adhesion strength is the peel test. To conduct the peel test, a strip of approximately ½ inch is cut around an equator of the golf ball, deep enough to cut through the entire layer to be tested. Next, a perpendicular cut is made across the strip and one end of the strip is peeled back just enough to make a tab of about ½ inch. The ball is then clamped into a jig by poles with the tab facing upward. The jig allows the clamped ball to freely rotate about an axis parallel to the poles. The tab is then clamped to a 20 lb. load cell of a universal testing machine. The tab is pulled away from the ball at a rate of 0.5 in./min., and the force required to pull the outer layer off of the underlying layer is recorded.

As measured using the peel test, the adhesion strength between layers of the golf ball formed from the cover and casing compositions of the present disclosure may be about 5 lb/in or greater, about 10 lb/in or greater, about 18 lb/in or greater, about 25 lb/in or greater, or about 30 lb/in or greater. In one embodiment, the adhesion strength between layers of a golf ball formed from the compositions of the present disclosure is about 5 lb/in to about 40 lb/in or about 10 lb/in to about 40 lb/in or about 10 lb/in to about 30 lb/in or about 15 lb/in to about 40 lb/in. In another embodiment, the adhesion strength of a layer of a golf ball formed from the compositions of the present disclosure is about 18 lb/in to about 40 lb/in or about 18 lb/in to about 30 lb/in or about 18 lb/in to about 25 lb/in or about 22 lb/in to about 35 lb/in or about 25 lb/in to about 40 lb/in or about 30 lb/in to about 40 lb/in.

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core assemblage using any suitable technique that is associated with the material used to form the layer. For example, the casing and cover compositions of the present disclosure may be formed into one or more layers of a golf ball by conventional compression or injection molding techniques.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core;
   a casing layer disposed on the core, the casing layer formed from a casing composition comprising carboxyl groups and having a moisture content; and
   a cover disposed on the casing layer, the cover formed from a cover composition comprising a base polymer and an adhesion promoter, wherein the cover composition comprises functional groups crosslinked with the carboxyl groups, and wherein the moisture content of the casing composition is greater than the percent by weight of adhesion promoter in the cover composition.

2. The golf ball of claim 1, wherein the adhesion promoter is included in the cover composition in an amount of about 0.1 percent to about 5 percent by weight.

3. The golf ball of claim 1, wherein the adhesion promoter comprises an organic silane.

4. The golf ball of claim 1, wherein the adhesion promoter comprises a mono reactive silane.

5. The golf ball of claim 1, wherein the adhesion promoter comprises a dual reactive silane.

6. The golf ball of claim 1, wherein the golf ball has an adhesion strength between the casing layer and cover, and wherein the adhesion strength ranges from about 5 lb/in to about 30 lb/in.

7. The golf ball of claim 6, wherein the adhesion strength ranges from about 15 lb/in to about 30 lb/in.

8. The golf ball of claim 1, wherein the base polymer is selected from the group consisting of polyurethanes, polyureas, and hybrids, copolymers, and blends thereof.

9. The golf ball of claim 1, wherein the core comprises a rubber formulation including a base rubber, and wherein the base rubber is a polybutadiene rubber, butyl rubber, or a blend thereof.

10. The golf ball of claim 1, wherein the casing composition comprises an ionomer.

11. A golf ball, comprising:
    a core;
    a casing layer disposed on the core, the casing layer formed from a casing composition comprising an ionomer and having a moisture content; and
    a cover disposed on the casing layer, the cover formed from a cover composition comprising a base polymer and adhesion promoter, wherein the adhesion promoter comprises silane,
    wherein the casing layer and cover are crosslinked by one or more of the following linkage:

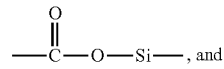

wherein the moisture content of the casing composition is greater than the percent by weight of adhesion promoter in the cover composition.

12. The golf ball of claim 11, wherein the casing composition comprises a moisture content of about 0.1 percent to about 1.2 percent by weight.

13. The golf ball of claim 11, wherein the base polymer is selected from the group consisting of polyurethanes, polyureas, and hybrids, copolymers, and blends thereof.

14. The golf ball of claim 11, wherein the adhesion promoter is included in the cover composition in an amount of about 0.1 percent to about 5 percent by weight.

15. The golf ball of claim 14, wherein the moisture content of the casing composition is about 0.01 to about 1.5 percent by weight of the casing composition.

16. A golf ball, comprising:
    a dual core comprising a center and an outer core layer disposed on the center;
    a casing layer on the core, the casing layer formed from a casing composition comprising carboxyl groups and having a moisture content; and
    a cover layer about the casing layer, the cover layer formed from a composition comprising a base polymer and a silane, wherein the casing layer and cover layer are bonded by crosslinks between functional groups in the cover layer and carboxyl groups in the casing layer,
    wherein the moisture content of the casing composition is greater than the percent by weight of adhesion promoter in the cover composition.

17. The golf ball of claim 16, wherein the casing composition comprises an ionomer.

18. The golf ball of claim 16, wherein at least one of the center and outer core layer comprises a rubber formulation including a base rubber, and wherein the base rubber is a polybutadiene rubber, butyl rubber, or a blend thereof.

19. The golf ball of claim 16, wherein the crosslinks comprises the following linkage:

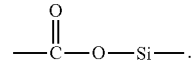

* * * * *